US 6,525,799 B1

(12) United States Patent
Fukuda

(10) Patent No.: US 6,525,799 B1
(45) Date of Patent: Feb. 25, 2003

(54) LIQUID CRYSTAL DISPLAY DEVICE HAVING SPACERS WITH TWO SIZES AND METAL FILMS AND PROTRUSIONS

(75) Inventor: Kazuo Fukuda, Fukushima (JP)

(73) Assignee: Nanox Corporation (JP)

( * ) Notice: Subject to any disclaimer, the term of this patent is extended or adjusted under 35 U.S.C. 154(b) by 0 days.

(21) Appl. No.: 09/440,420

(22) Filed: Nov. 15, 1999

(30) Foreign Application Priority Data

Nov. 27, 1998 (JP) .......................... 10-337687
Aug. 20, 1999 (JP) .......................... 11-233964

(51) Int. Cl.⁷ .......................... G02F 1/1339
(52) U.S. Cl. .................. 349/157; 349/153; 349/155
(58) Field of Search ........................ 349/157, 155, 349/156, 153

(56) References Cited

U.S. PATENT DOCUMENTS

| 5,235,741 A | * | 8/1993 | Mase .................... 29/830 |
| 5,481,388 A | * | 1/1996 | Aoya .................... 359/80 |
| 5,946,057 A | * | 8/1999 | Kusanagi ................ 349/40 |
| 6,144,438 A | * | 11/2000 | Izumi .................... 349/155 |

FOREIGN PATENT DOCUMENTS

| JP | 60-101520 A | * | 6/1985 | .......... G02F/1/133 |
| JP | 04217228 A |   | 8/1992 | |
| JP | 05241183 A |   | 9/1993 | |
| JP | 6-11722 A | * | 1/1994 | .......... G02F/1/1345 |
| JP | 06308516 A |   | 11/1994 | |

* cited by examiner

Primary Examiner—Toan Ton
Assistant Examiner—Andrew Schechter
(74) Attorney, Agent, or Firm—Rossi & Associates

(57) ABSTRACT

A liquid crystal display device includes a pair of first and second transparent substrates having first and second transparent conductive films formed on opposing surfaces, with liquid crystal between the first and second transparent substrates. An airtight seal encapsulates the liquid crystal, and includes a conducting portion which electrically interconnects the transparent conductive films. The transparent conducive films have metal thin films deposited on respective surface portions, including the conducting portion. A driving circuit is connected to the metal thin films, to control the liquid crystal. Spacer members are mixed and generally evenly dispersed in the seal, for controlling the thickness of the seal, which comprises first spacer members mixed in the conducting portion, and second spacer members mixed in portions of the seal other than the conducting portion. The first spacer members have a particle diameter smaller than that of the second spacer members by a predetermined value X.

7 Claims, 14 Drawing Sheets

LIQUID CRYSTAL DISPLAY DEVICE HAVING SPACERS WITH TWO SIZES AND METAL FILMS AND PROTRUSIONS

BACKGROUND OF THE INVENTION

1. Field of the Invention

The present invention relates to a liquid crystal display device and a method of manufacturing the same, and more particularly to a liquid crystal display device for use in miniature portable apparatuses such as a cellular phone and an electronic notebook, and a method of manufacturing the same.

2. Prior Art

In recent years, with rapid development of information communication technology, liquid crystal display devices have acquired an increasing importance, not least in the field of miniature portable apparatuses such as a cellular phone and an electronic notebook.

A liquid crystal display device of this kind is comprised of a liquid crystal cell formed by encapsulating liquid crystal in an airtight manner between two glass substrates (first and second glass substrates), and a driving circuit (hereinafter referred to as "driving IC") arranged on the periphery of the liquid crystal cell, for driving and controlling the liquid crystal cell, the liquid crystal cell and the driving IC together composing a single module.

Conventionally, in the manufacture of a miniature module, a so-called "multi-cell bonding" method has been employed in which a multiplicity of liquid crystal cells are formed on a large-sized glass substrate in a single continuous process by carrying out a multi-cell bonding. Subsequently, driving ICs are directly mounted onto a liquid crystal panel by means of a so-called COG (chip on glass) mounting method. This manufacturing method allows a multiplicity of liquid crystal cells to be obtained in a single process by means of multi-cell bonding, leading to a substantial improvement of productivity, which, in turn, is combined with the adoption of the COG mounting method to reduce the number of manufacturing steps, and allow the manufacture of miniature modules at low costs.

FIG. 16 is a top plan view schematically showing essential parts of a conventional liquid crystal display device of this kind. Specifically, the liquid crystal display device includes a seal 52 in the form of a frame having a liquid crystal injection port 51 and sandwiched between a lower first glass substrate 53 and an upper second glass substrate 54, both transparent. The injection port 51, upon injection of liquid crystal 55 therethrough into the interior of the seal, is sealed with a sealant such as an ultraviolet ray-setting resin (hereinafter referred to as "UV-setting resin") or the like, thereby hermetically encapsulating the liquid crystal 55 with the seal 52 in an airtight manner. A vertical conducting portion 56 is provided in the vicinity of a corner of the seal 52, for conductive connection between respective transparent conductive films formed on the surfaces of the first and second glass substrates. The seal 52 is formed by screen-printing in a frame pattern a sealant which contains epoxy resin as a primary constituent.

FIG. 17 is a sectional view showing details of the seal 52. As shown in the figure, the seal 52 contains a multiplicity of spacers 58 and conductive particles 59 mixed and generally evenly dispersed therein. The thickness of the seal 52 is controlled by the spacers 58, and the conductive connection between the transparent conductive films formed on the surfaces of the first and second glass substrates 53, 54 is ensured by means of anisotropic conduction obtained with the conductive particles 59. Although the conductive particles 59 has only to be mixed into the vertical conducting portion 56 alone in order to secure conductive connection between the transparent conductive films, they are generally mixed in the seal 52 uniformly over the entire region thereof in view of production efficiency.

In the modern information society, increasingly refined display patterns on the liquid crystal display are demanded so as to be able to display as much information as possible. To this end, connection wiring 57 connected to the driving IC (see FIG. 16) needs to be formed with a narrow line width, especially in the vicinity of the driving IC, where the connection wiring 57 needs to be formed extremely fine with a line width not exceeding 100 μm.

However, when the connection wiring 57 is formed extremely fine, the wiring resistance becomes so high that if the connection wiring 57 is composed solely of the transparent conductive film, a voltage drop in the connection wiring would become so large as to interfere with the normal operation of the liquid crystal display.

Therefore, it has been a conventional practice to deposit a metal thin film which has small wiring resistance and hence excellent conductivity on the transparent conductive film such that the connection wiring 57 has a two-layered structure composed of a transparent conductive film and a metal thin film.

As described above, the first and second glass substrates 53, 54 have the transparent conductive film, specifically an indium tin oxide (hereinafter referred to as "ITO") film, formed on respective surfaces thereof. A transparent insulating film is further laminated on the surface of the ITO film at a portion corresponding to the liquid crystal display portion. Conventionally, this transparent insulating film is used as a mask to perform electroless nickel (Ni)—phosphorus (P) alloy plating and electroless gold (Au) plating on the surface of the transparent conductive film, thereby forming a metal thin film on a specified portion of the ITO film. Desired extremely fine connection wiring 57 can be obtained in this way while preventing the metal thin film from adhering to the liquid crystal display portion.

In the electroless plating, a Ni—P alloy precipitates selectively on the portion where the ITO film is formed, and then Au precipitates by substitution reaction with P on the Ni—P alloy as well as by an autocatalytic reaction of Au ion. Thus, desired extremely fine connection wiring 57 can be obtained without the plated film adhering to the liquid crystal display portion. In this way, a metal precipitates selectively on the ITO film as a transparent conductive film, depositing a metal thin film on the ITO film. Since a metal film is not formed on those portions where the ITO film is not formed, connection wiring 57 composed of a metal thin film can be formed at the desired portion without need for patterning to form the metal thin film.

However, in the conventional liquid crystal display device, as described above, electroless plating is performed using the transparent insulating film as a mask so that the plated film, that is, the metal thin film, deposits also on the transparent conductive film in the vertical conducting portion 56 where no transparent insulating film is coated.

Further, since a multiplicity of liquid crystal cells are, as described earlier, produced at one time by "multi-cell bonding" in a single continuous process, the metal thin film deposits in the vertical conducting portion 56 on the side of the second glass substrate 54 as well as on the side of the first glass substrate 53.

FIG. 18 is a sectional view taken along line X—X in FIG. 16, and FIG. 19 is a sectional view taken along line XI—XI in FIG. 18. ITO films 60, 61 are formed on the opposed surfaces of the first and second glass substrates 53, 54, respectively. Since no transparent insulating film is formed on the vertical conducting portion 56 on the first and second glass substrates 53, 54, the plating treatment is also performed on portions of the ITO film 60, 61 of the vertical conducting portion 56 to form metal thin films 62.

Therefore, if the spacers 58 used in the vertical conducting portion 56 have the same particle diameter as those in portions other than the vertical conducting portion 56, the thickness of the seal 52 in the vertical conducting portion 56 becomes larger than that in the other portions by the combined film thickness 2×t' of both metal films 62 on the opposed surfaces of the first and second glass substrates 53, 54, t' representing the thickness of the metal film 62. This gives rise to a variation of the thickness of the seal 52, leading to non-uniform distribution of the thickness of the liquid crystal layer, resulting in unevenness in the background color during liquid crystal display.

As described above, the seal 52 is formed by screen-printing in a frame pattern a sealant containing epoxy resin as a primary constituent. This gives rise to another problem that resin thin films 64 are formed on the upper and lower surfaces of the seal 52, and these resin thin films 64 act as insulating films, leading to conduction failure. That is, as shown in FIG. 20 by way of example, the first glass substrate 53 has the ITO film 61 and metal thin film 62 laminated on the upper surface thereof, and the resin thin film 64 is formed on the lower surface of the seal 52. A similar resin thin film 64 is likewise formed on the upper surface of the seal 52. These resin thin films 64 may block the electrical conduction between the ITO films 60, 61 and the conductive particle 59, and may lead to conduction failure.

SUMMARY OF THE INVENTION

It is a first object of the present invention to provide a liquid crystal display device and a method of manufacturing the same, which do not give rise to color unevenness and exhibits improved reliability.

It is a second object of the present invention to provide a liquid crystal display device and a method of manufacturing the same, which do not give rise to color unevenness nor conduction failure, and exhibits improved reliability.

Since the conducting portion (vertical conducting portion) provided in the seal is for securing conductive connection between the transparent conductive films (ITO films), the metal thin films on the transparent conductive films are considered unnecessary in the conducting portion.

When plating treatment is performed, however, metal thin films necessarily deposit on the transparent conductive films in the conducting portion, because no transparent insulating film has been coated on the conducting portion.

On the other hand, in view of the production efficiency of liquid crystal display devices, it is considered necessary that liquid crystal cells be produced with high efficiency by performing multi-cell bonding on a large-sized glass substrate as is employed in the prior art.

Therefore, in view of the present state of production technology and operational efficiency, it is considered desirable to deal with the problem of color unevenness in the background color during liquid crystal display on the assumption that the metal thin films necessarily deposit on the transparent conductive films.

Thus, the present inventor has made intensive studies in order to provide a liquid crystal display device that can achieve the first object on the assumption that the metal thin films deposit on the transparent conductive films in the conducting portion, and as a result, reached the finding that the thickness variation of the liquid crystal layer needs to be limited to not greater than 0.1 $\mu$m in order to reduce the color unevenness to a level as low as possible and hence obtain uniform background color. Further, in order to restrain the thickness variation of the liquid crystal layer to not greater than 0.1 $\mu$m, it has been found necessary that first spacer members mixed in the conducting portion be formed smaller in size than second spacer members mixed in other portions of the seal by a predetermined value X so as to reduce the thickness of the seal and thereby make the thickness distribution of the liquid crystal layer generally uniform.

The present invention is based on the above described finding. Thus, a liquid crystal display device according to the present invention includes a first transparent substrate having a first transparent conductive film formed on a surface thereof, a second transparent substrate having a second transparent conductive film formed on a surface thereof opposed to the first transparent conductive film, liquid crystal sandwiched between the first transparent substrate and the second transparent substrate, a seal encapsulating the liquid crystal in an airtight manner, and a driving circuit, the seal including a conducting portion (conducting seal portion) disposed so as to electrically interconnect the first transparent conductive film and the second transparent conductive film, the first and second transparent conductive films having metal thin films deposited on respective predetermined surface portions thereof including the conducting portion, the driving circuit being connected to the metal thin films, for carrying out liquid crystal display control.

The liquid crystal display device according to the present invention is characterized by an improvement comprising a plurality of spacer members mixed and generally evenly dispersed in the seal, for controlling the thickness of the seal, the plurality of spacer members comprising first spacer members mixed in the conducting portion, and second spacer members mixed in portions of the seal other than the conducting portion, the first spacer members having a particle diameter smaller than that of the second spacer members by a predetermined value X.

With the above described construction, the first spacer members mixed in the conducting portion have a diameter smaller than that of the second spacer members mixed in a portion of the seal other than the conducting portion by the predetermined value X. As a result, even if metal thin films are deposited on the transparent conductive films, the thickness of the seal at the conducting portion can be kept small, and the thickness distribution of the liquid crystal layer can be made generally uniform.

Further, it has been found by the present inventor as a result of further intensive studies that the predetermined value X is dependent upon the film thickness of the metal thin films. Specifically, it has been found that by setting the predetermined value X in a range of (2t+0.5) to (2t−0.6) $\mu$m, the thickness of the seal can be made generally uniform so that color unevenness of the background color during liquid crystal display can be eliminated.

Thus, the present invention is also characterized in that the predetermined value X is set in a range of (2t+0.5) to (2t−0.6) $\mu$m (t represents the film thickness of the metal thin films).

Further, after intensive studies to provide a liquid crystal display device that can achieve the second object of the present invention, it has been found by the present inventor that occurrence of conduction failure can be avoided by forming a multiplicity of protrusions on the metal thin films, that have a height exceeding the film thickness of the resin thin film.

Thus, a liquid crystal display device according to the present invention is characterized in that, besides a multiplicity of conductive members being mixed in the conducting portion, a multiplicity of protrusions are formed on the metal thin films, and the first and second transparent conductive films are electrically interconnected via the conductive members and the protrusions.

Further, it has been found from the studies conducted by the present inventor that the film thickness of the resin thin films formed on the upper and lower surfaces of the seal is not greater than 0.04 μm. Therefore, the peak height of the protrusions needs to be at least larger than the thickness of the resin thin films. On the other hand, if the peak height of the protrusions is too large, it is difficult to control the thickness of the seal. Further, if the number of the protrusions per 1 $\mu m^2$ is too small, that is, if the number density of the protrusions is too small, the conductive members and the protrusions would not come into contact with each other. But, if the number density is too large, adjoining protrusions may be merged together. Thus, there seems to be an optimum range in the peak height and the number density of protrusions.

It has been found from various experiments conducted by the present inventor that by setting the peak height of the protrusions in a range of 0.05 to 0.50 μm, and the number density in a range of 0.1 to 0.5 pc./$\mu m^2$, respectively, the protrusions and the conductive members never fail to come into contact with each other, and conductive connection between the first and the second transparent conductive films can be reliably secured.

Thus, a liquid crystal display device according to the present invention is further characterized in that the peak height of the protrusions is set in a range of 0.05 to 0.50 μm, and the number density of the protrusions is set in a range of 0.1 to 0.5 pc./$\mu m^2$.

Further, to attain the first object, the present invention provides a method of manufacturing a liquid crystal display device, which comprises the steps of:

1) forming first and second transparent conductive films of predetermined pattern on opposed surfaces of first and second transparent substrates, respectively;
2) forming first and second transparent insulating films on portions of the first and second transparent conductive films corresponding to a liquid crystal display portion, respectively;
3) performing electroless plating using the first and second transparent insulating films as a mask to cause an alloy to selectively precipitate on portions of the first transparent and second transparent conductive films where the first and second transparent insulating films are not formed, thereby forming metal thin films on the portions of the first and second transparent conductive films;
4) printing a resin which contains second spacer members generally evenly dispersed therein, on one of the first and second transparent substrates, thereby forming a main seal portion;
5) printing a resin which contains first spacer members generally evenly dispersed therein, the first spacer members having a particle diameter smaller than that of the second spacer members by a predetermined value, on the other of the first and second transparent substrates, thereby forming a conducting seal portion;
6) laminating the first and second transparent substrates such that the main seal portion and the conducting seal portion are aligned with each other, to form a seal by the main seal portion and the conducting seal portion; and
7) injecting liquid crystal into the seal, and breaking the laminated first and second transparent substrates into a plurality of liquid crystal cells.

Further, to attain the second object, the present invention provides a method of manufacturing a liquid crystal display device, which comprises the steps of:

1) forming first and second transparent conductive films of predetermined pattern on opposed surfaces of first and second transparent substrates, respectively;
2) forming first and second transparent insulating films on portions of the first and second transparent conductive films corresponding to a liquid crystal display portion, respectively;
3) performing electroless Ni—P alloy plating using the first and second. transparent insulating films as a mask to cause a NI—P alloy to selectively precipitate on portions of the first and second transparent conductive films where the first and second transparent insulating films are not formed, followed by electroless gold plating using a predetermined electroless gold plating bath to cause Au to precipitate on a Ni film by substitution reaction with P, thereby forming metal thin films with a multiplicity of protrusions having a predetermined peak height H and a number density ρ formed on surfaces thereof on the portions of the first and second transparent conductive films;
4) printing a resin which contains second spacer members generally evenly dispersed therein, on one of the first and second transparent substrates, thereby forming a main seal portion;
5) printing a resin which contains first spacer members generally evenly dispersed therein, the first spacer members having a particle diameter smaller than that of the second spacer members by a predetermined value, on the other of the first and second transparent substrates, thereby forming a conducting seal portion;
6) laminating the first and second transparent substrates such that the main seal portion and the conducting seal portion are aligned with each other, to form a seal by the main seal portion and the conducting seal portion; and
7) injecting liquid crystal into the seal, and breaking the laminated first and second transparent substrates into a plurality of liquid crystal cells.

The above and other objects of the invention will become more apparent from the following description taken in conjunction with the accompanying drawings.

DETAILED DESCRIPTION OF PREFERRED EMBODIMENTS

The present invention will now be described in detail with reference to the drawings showing embodiments thereof.

Figure 1:
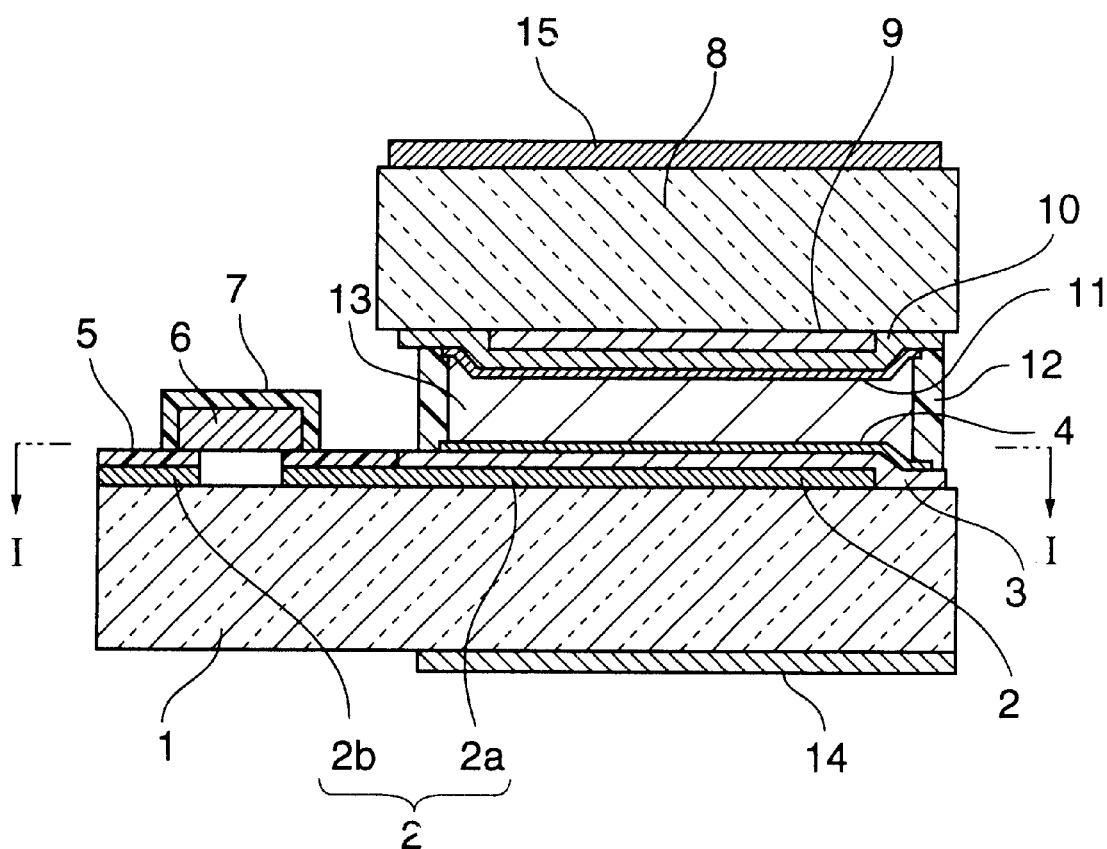
FIG. 1 is a sectional view showing the construction of a liquid crystal display device according to an embodiment of the present invention.

Referring first to FIG. 1, there is shown the construction of a liquid crystal display device according to a first embodiment of the present invention. Liquid crystal display device according to the present embodiment is applied to a STN (Super Twisted Nematic) type liquid crystal display device which exhibits high contrast.

In FIG. 1, reference numeral 1 denotes a first glass substrate 1 (first transparent substrate) of a rectangular shape which is formed of low alkali glass or the like. On an upper surface of the first glass substrate 1, there is formed a first transparent conductive film 2 formed of ITO (ITO film) in a predetermined pattern. A first transparent insulating film 3 formed of SiO2—TiO2 is laminated on a portion of an upper surface of the first transparent conductive film 2 corresponding to a liquid crystal display portion. A first orientation film 4 formed of polyimide or the like is laminated on an upper surface of the first transparent insulating film 3.

On a portion of the upper surface of the first transparent conductive film 2 outside of the liquid crystal display portion, there is deposited a metal thin film 5 formed of Ni, Au and the like, and a driving IC 6 is mounted on the metal thin film 5. The driving IC 6 is covered with a protective resin 7.

A second glass substrate (second transparent substrate) 8 formed of a similar material to that of the first glass substrate 1 is arranged opposite the first glass substrate 1, with a second transparent conductive film 9 formed of ITO (ITO film) being formed on a surface of the second glass substrate 8 opposed to the first transparent conductive film 2. A second transparent insulating film 10 formed of SiO2—TiO2 is formed on a surface of the second transparent conductive film 9, and a second orientation film 11 formed of polyimide or the like is laminated on a surface of the second transparent insulating film 10.

A seal 12 in the form of a frame is sandwiched between the first and second glass substrates 1, 8. Liquid crystal 13 is injected into the interior of the seal 12, the liquid crystal 13 being enclosed by the seal 12 and the first and the second orientation films 4, 11 to form a liquid crystal cell therewith. Further, polarizing plates 14, 15 are applied to back side surfaces of the first and second glass substrates 1, 8, respectively.

In the present embodiment, the first transparent conductive film 2 forms segment side display electrodes 2a and an external electrode 2b, and the second transparent conductive film 9 forms common side display electrodes.

Figure 2:
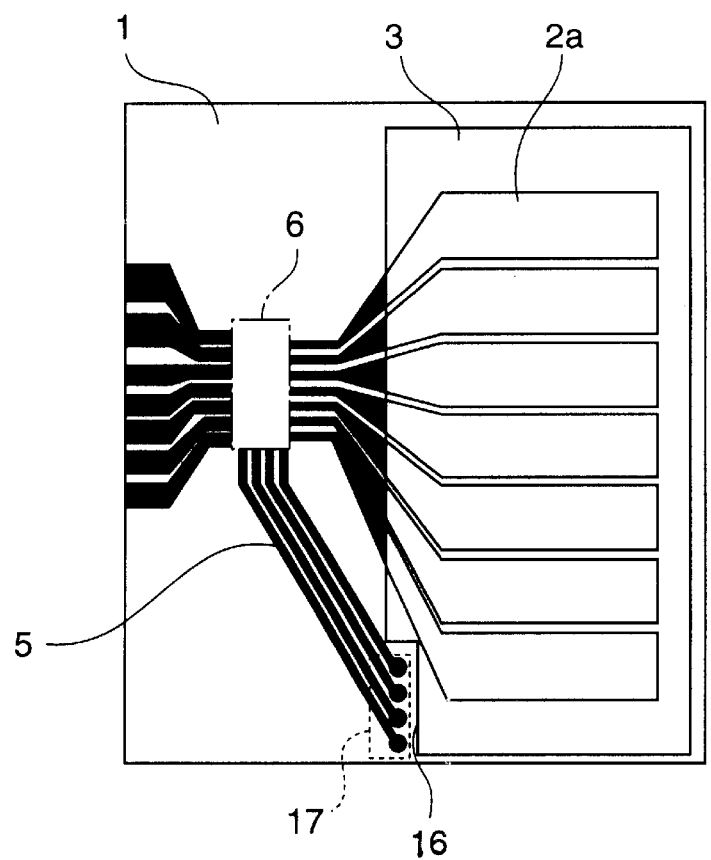
FIG. 2 is a view taken along an arrow I—I in FIG. 1.

FIG. 2 is a view taken along arrow I—I in FIG. 1.

Seven segment side display electrodes 2a are formed on the surface of the first glass substrate 1 by the first transparent conductive film 2 patterned in a predetermined pattern. A transparent insulating film 3 of a generally rectangular shape with a cut-out portion 16 is laminated on the surface of the segment display electrodes 2a. The metal thin film 5 is selectively deposited using the transparent insulating film 3 as a mask on the first transparent conductive film 2. Extremely fine connection wiring with a line width not greater than 100 μm is formed by the metal thin film 5.

A vertical conducting portion 17 is provided in a recess formed by the cut-out portion 16, for conductive connection between the first transparent conductive film 2 and the second transparent conductive film 9.

Figure 3:
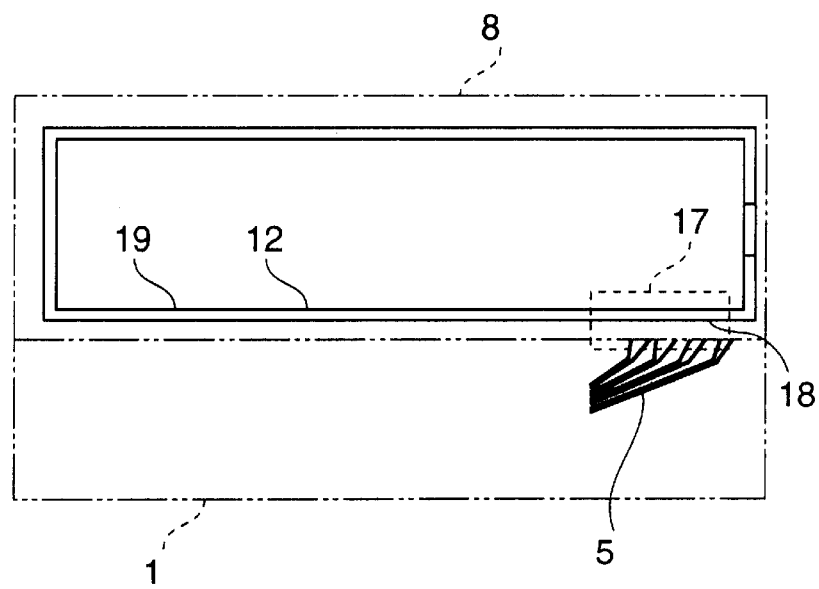
FIG. 3 is a plan view showing a seal.

As shown in FIG. 3, the seal 12 is divided into a conducting seal portion 18, and a main seal portion 19 other than the conducting seal portion 18, the conducting seal portion 18 electrically interconnecting the first transparent conductive film 2 and the second transparent conductive film 9 to enable the first and second transparent conductive films 2, 9 to be in conductive connection with each other.

Figure 4:
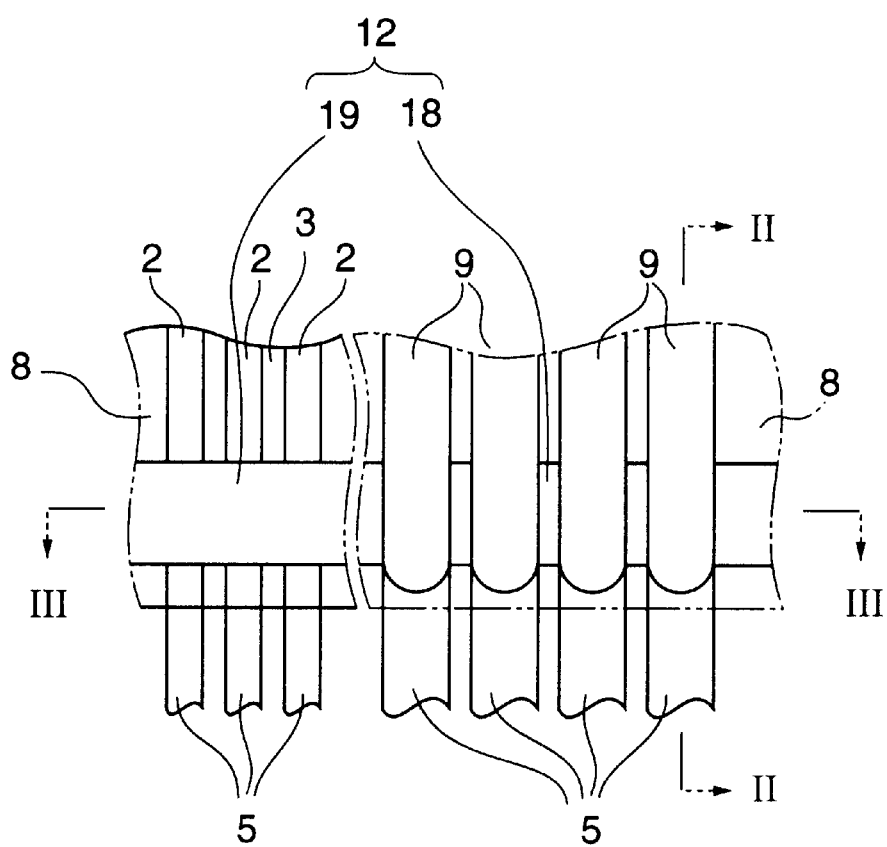
FIG. 4 is a top plan view showing a vertical conducting portion and its vicinity.

FIG. 4 is a plan view showing the vertical conducting portion 17 and its vicinity.

The first transparent insulating film 3 is formed under the main seal portion 19, and the first transparent conductive film 2 is formed as the segment side display electrodes 2a under the first transparent insulating film 3. The metal thin film 5 is deposited on a portion of the first transparent conductive film 2 where the first transparent insulating film 3 is not formed.

On the conducting portion 18 side, on the other hand, the metal thin film 5 is formed on the lower surface of the second transparent conductive film 9 and the upper surface of the first transparent conductive film 2, thus providing electrical connection with each other through the conducting seal portion 18 sandwiched therebetween.

Figure 5:
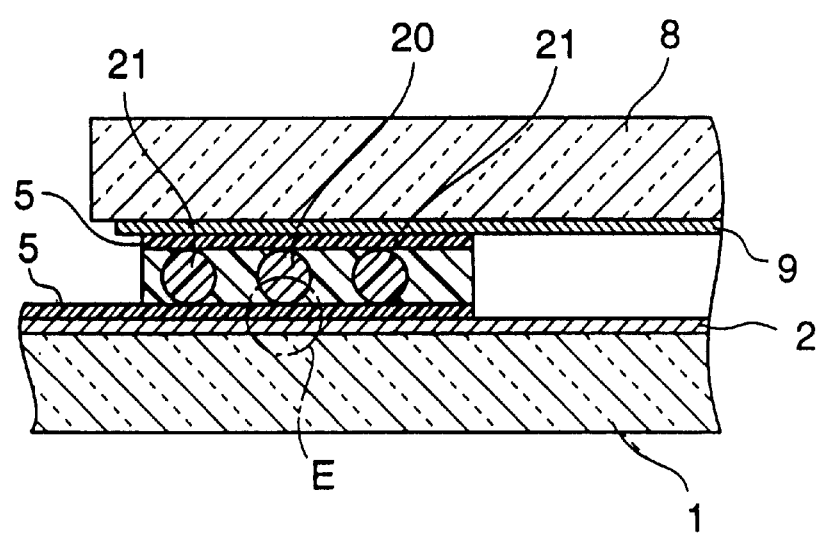
FIG. 5 is a sectional view taken along line II—II in FIG. 4.
Figure 6:
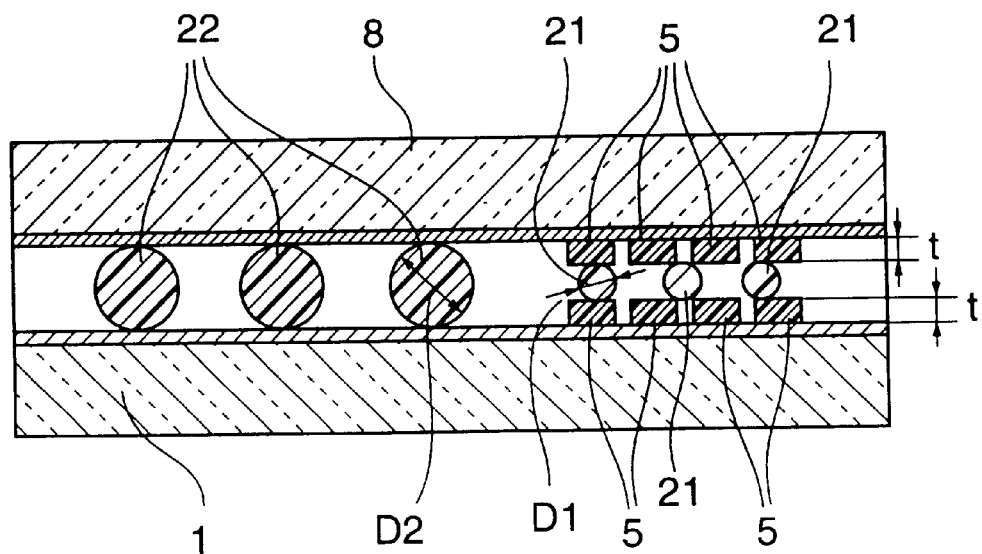
FIG. 6 is a sectional view taken along line III—III in FIG. 4.

FIG. 5 is a sectional view taken along line II—II in FIG. 4, and FIG. 6 is a sectional view taken along line III—III in FIG. 4.

As described above, the metal thin film 5 is formed on the upper surface of the first transparent conductive film 2 and on the lower surface of the second transparent conductive film 9, the conducting seal portion 18 being sandwiched between these metal thin films 5.

As shown in FIG. 5, a multiplicity of conductive particles 20 of Au for providing conductive connection between the metal thin films 5 and first spacers (first spacer members) 21 for controlling the thickness of the seal 12 are mixed in the conducting seal portion 18.

As shown in FIG. 6, second spacers (second spacer members) 22 having a particle diameter larger than that of the first spacers 21 are mixed and generally evenly dispersed in the main seal portion 19. That is, the first and second spacers 21, 22 with the particle diameter of the first spacers 21 (hereinafter referred to as "the first spacer diameter D1") being smaller than the particle diameter of the second spacers 22 (hereinafter referred to as "the second spacer diameter D2") by a predetermined value X µm are mixed and generally evenly dispersed in the conducting seal portion 18 and the main seal portion 19, respectively.

More specifically, the predetermined value X is set in a range given by the following equation (1):

$$X=\{(2t+0.5) \sim (2t-0.6)\} \tag{1}$$

where t represents the thickness of the metal thin films 5. The reason why the predetermined amount X is set in the range as given by the equation (1) is as follows:

As described above, the metal thin films 5 are formed on the upper surface of the first transparent conductive film 2 and on the lower surface of the second transparent conductive film 9. Thus, in order to obtain the uniform thickness of the liquid crystal layer, that is, the seal 12, and thereby avoid the color unevenness in the liquid crystal display, it is necessary to make the first spacer diameter D1 smaller than the second spacer diameter D2 by the predetermined value X.

The seal 12 is obtained by sticking together, by application of heat and pressure, the first and second glass substrates 1, 8. If the predetermined value X exceeds (2t+0.5), the thickness of the conducting seal portion 18 will become smaller than that of the main seal portion 19 after the first and second glass substrates 1, 8 are stuck together by application of heat and pressure so that it is difficult to obtain generally uniform thickness distribution of the liquid crystal layer. Conversely, if the predetermined value X is less than (2t−0.6), the thickness of the main seal portion 19 will become smaller than that of the conducting portion 18 so that it will be again difficult to control the thickness of the liquid crystal layer to be generally uniform. Thus, if the spacer diameters of the first and the second spacer 21, 22 are set outside the range given by the equation (1), the thickness variation of the liquid crystal layer will exceed 0.1 µm and the uniformity of the thickness distribution will be impaired, leading to the color unevenness of the background color during liquid crystal display. For this reason, the predetermined value X has been set in the range of (2t+0.5) to (2t−0.6) µm, as described above, and preferably in a range of (2t+0.4) to (2t−0.1) µm.

Figure 7:
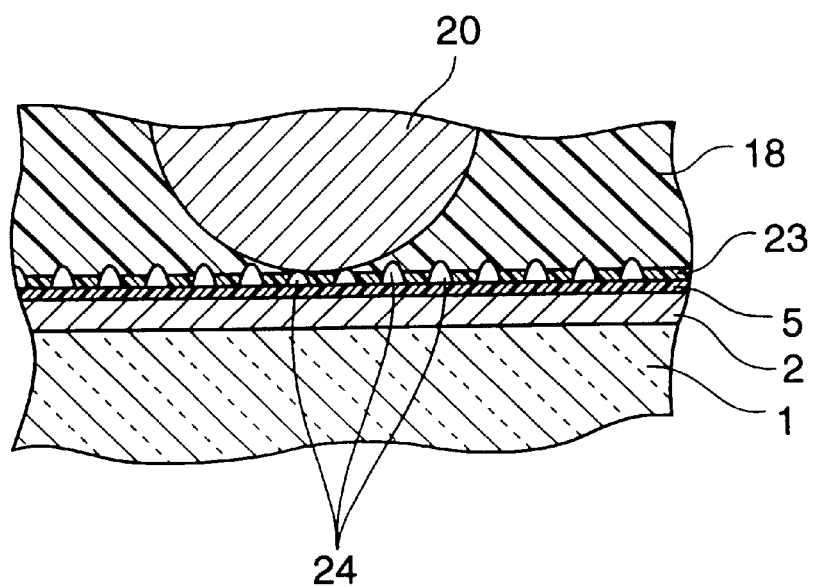
FIG. 7 is an enlarged sectional view of E portion of FIG. 5.

In the present embodiment, as shown in FIG. 7, each metal thin film 5 has a multiplicity of protrusions 24 formed on a surface thereof. As described earlier, in the conventional liquid crystal display device, the seal 12 contains epoxy resin as a primary constituent. When the seal 12 is formed by screen printing, a resin thin film is formed on the lower and upper surfaces of the seal 12. A resin thin film 23 is thus formed on the lower and upper surfaces of the conducting seal portion 18. The resin thin film 23 may act as an insulating film to block the contact between the metal thin film 5 and the conductive particles 20, leading to conduction failure.

For this reason, in the present embodiment, a multiplicity of protrusions 24 are provided on the surface of the metal thin film 5 to avoid occurrence of conduction failure between the metal thin film 5 and the conductive particles 20. Specifically, the peak height H (predetermined height) of the protrusions 24 is set in a range of 0.05 to 0.50 µm, and the number density ρ of the protrusions 24 is set in a range of 0.1 to 0.50 pc./µm².

The reason why the peak height H and the number density ρ are set to the above described values is as follows:
(a) Peak Height H of the Protrusions 24

Electrical conduction between the metal thin film 5 and the conductive particles 20 can be secured by the provision of a multiplicity of protrusions 24. But, the thickness of the resin film 23 is about 0.04 µm, so that if the peak height H is less than 0.05 µm, this might be exceeded by the film thickness of the resin thin film 23 and the goal of avoiding the occurrence of conduction failure might not be accomplished. On the other hand, if the peak height H of the protrusions 24 exceeds 0.50 µm, the peak height H will become so large that it is difficult to control the thickness of the liquid crystal layer based on the first spacer members 20. For this reason, in the present embodiment, the peak height H (predetermined height) of the protrusions 24 has been set to the range of 0.05 to 0.50 µm.
(b) Number Density ρ of the Protrusions 24

To ensure electrical conduction between the metal thin film 5 and the conductive particles 20, the number density of the protrusions is also an important factor. If the number density ρ of the protrusions 24 is less than 0.1 pc./µm², there might be domains where conductive particles 20 are only in contact with the resin thin film 23 and not in contact with the metal thin film 5, which might cause conduction failure. On the other hand, since the extension of the protrusions 24 is of the order of 1 µm, if the number density ρ exceeds 0.5 pc./µm², adjoining protrusions 24 might merge and become flat. For this reason, the number density ρ of the protrusions 24 has been set to the range of 0.1 to 0.5 pc./µm² in the present embodiment.

Now, the method of manufacturing the above described liquid crystal display device will be explained.

Figure 8:
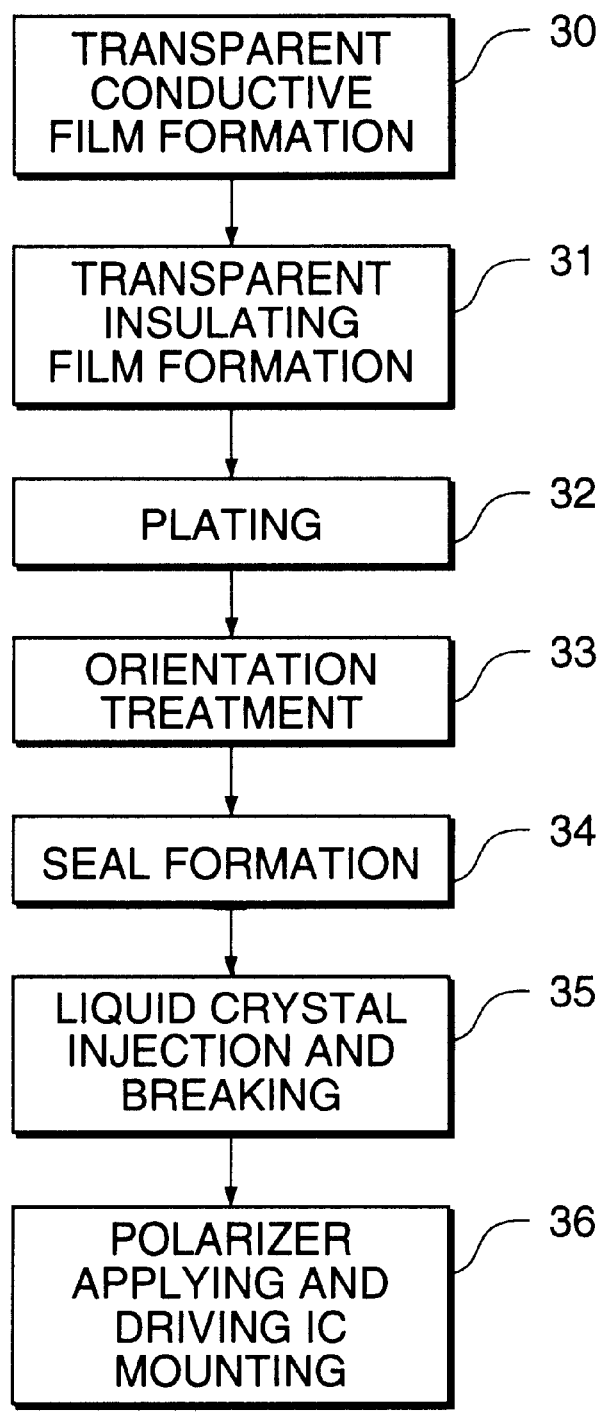
FIG. 8 is a general flowchart showing a method of manufacturing a liquid crystal display device according to an embodiment of the present invention.

FIG. 8 is a general flowchart showing the manufacturing method for the liquid crystal display device according to an embodiment of the present invention, and FIGS. 9 through 15 are flowcharts showing details of individual processes.

First, in a transparent conductive film forming process 30 in FIG. 8, the first and second transparent conductive films 2, 9 of predetermined patterns are formed on the surfaces of the first and second glass substrates 1, 8.

Figure 9:
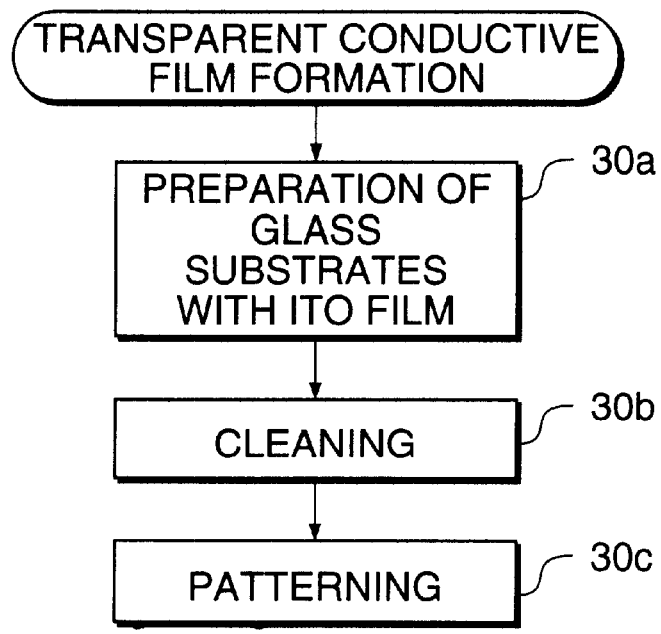
FIG. 9 is a flowchart showing a transparent conductive film forming process.

More specifically, as shown in FIG. 9, the first and second glass substrates 1, 8, each with one of the surfaces entirely coated with an ITO film by the well-known sputtering method or the like are prepared (step 30a), followed by a cleaning step 30b to perform cleaning operation to remove contamination and dust attached to the surfaces of the ITO films. Then, in patterning step 30c, the well-known photolithographic technique is used to form the first and second ITO films 2, 9 having predetermined patterns. That is, after resist patterns are formed on portions where the ITO films are to be formed, etching treatment is performed with the resist patterns as a mask. After the etching treatment, the resist is removed to obtain the first and second ITO films 2, 9 of the predetermined patterns.

Then, in a transparent insulating film forming process 31 in FIG. 8, the first and second transparent insulating films 3, 10 are formed on the portions of the surfaces of the first and the second ITO films 2, 9 corresponding to the liquid crystal display portion.

Figure 10:
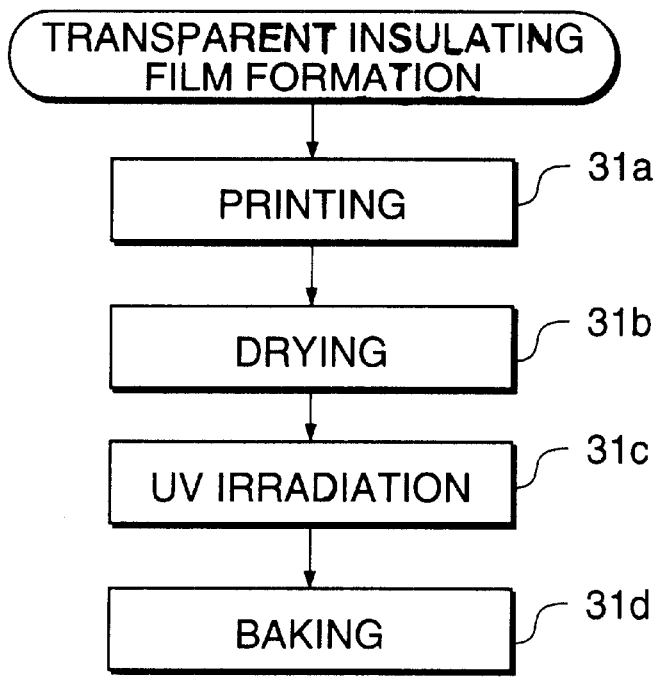
FIG. 10 is a flowchart showing a transparent insulating film coating process.

More specifically, as shown in FIG. 10, in printing step 31a, a flexographic form having such a shape as to prevent the plated metal from adhering to the display portion of the liquid crystal display device in a plating process described later, is prepared, and a Si—Ti alkoxide solution is applied by flexographic printing to the surfaces of the first and second ITO films 2, 9. The composition of the Si—Ti alkoxide solution is adjusted so as to obtain a ratio of SiO2 TiO2=1:1 in terms of SiO2 and TiO2. The printing conditions of the flexographic printing and the viscosity of the Si—Ti alkoxide solution are adjusted such that the film thickness of the transparent insulating films 3, 10 falls within a range of 0.05 to 0.08 µm.

In the following drying step 31b, drying is performed on a hot plate heated to 80° C. for 3 to 5 minutes, followed by an ultraviolet ray (UV) irradiation step 31c in which a high pressure mercury lamp or the like is used to irradiate an ultraviolet ray of wavelength 250 nm. Then, in baking step 31d, baking treatment is performed at 300° C. for 30 minutes, to form the transparent insulating films 3, 10 of SiO2—TiO2 on the surfaces of the first and the second electrodes 2, 9.

Then, in a plating process 32 in FIG. 8, the metal thin film 5 is formed by electroless plating on the first and second glass substrates 1, 8.

Figure 11:
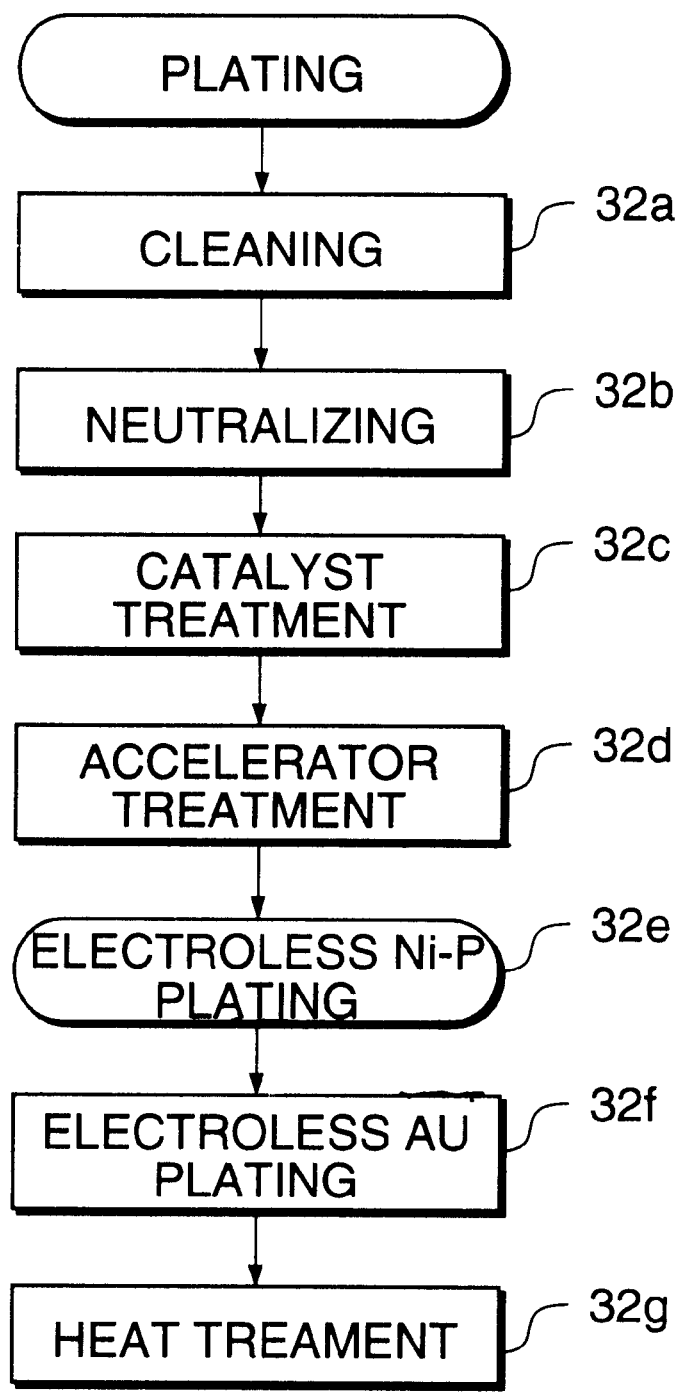
FIG. 11 is a flowchart showing a plating process.

More specifically, as shown in FIG. 11, after degreasing is performed with an alkaline solution in cleaning step 32a, neutralization with hydrochloric acid is performed in neutralizing step 32b, followed by a catalyst treatment step 32c in which the first and second glass substrates 1, 8 are dipped in a Sn—Pd mixture solution which is called catalyst, and then rinsed with water. In the following accelerator treatment step 32d, using sulfuric acid, hydrochloric acid or the like as an accelerator, the first and second glass substrates 1, 8 are dipped in an accelerator solution to seed catalytic metal nuclei (Pd) on the surfaces to facilitate precipitation of the plated metal. Then, in electroless Ni—P plating step 32e, electroless Ni—P alloy plating is performed using the transparent insulating films 3, 10 as a mask, and phosphinate as a reducing agent, to cause a Ni—P alloy to precipitate selectively on the portions of the ITO films 2, 9 where the transparent insulating films 3, 10 are not formed. In the following electroless Au plating step 32f, Au is caused to precipitate on the Ni film by substitution reaction with P using Muden Gold (manufactured by Okuno Chemical Industries Co., Ltd.) as an electroless Au plating bath, thereby depositing the metal thin films 5 having a multiplicity of protrusions 24 formed on the surfaces on the first and the second transparent conductive films 2, 9. Finally, in heat treatment step 32g, heat treatment is performed at 250° C. for 30 minutes to increase the adhesion strength of Ni.

Next, in an orientation treatment process 33 in FIG. 8, the first and second orientation films 4, 11 are applied to the first and second glass substrates 1, 8 for orienting liquid crystal molecules in a predetermined direction.

Figure 12:
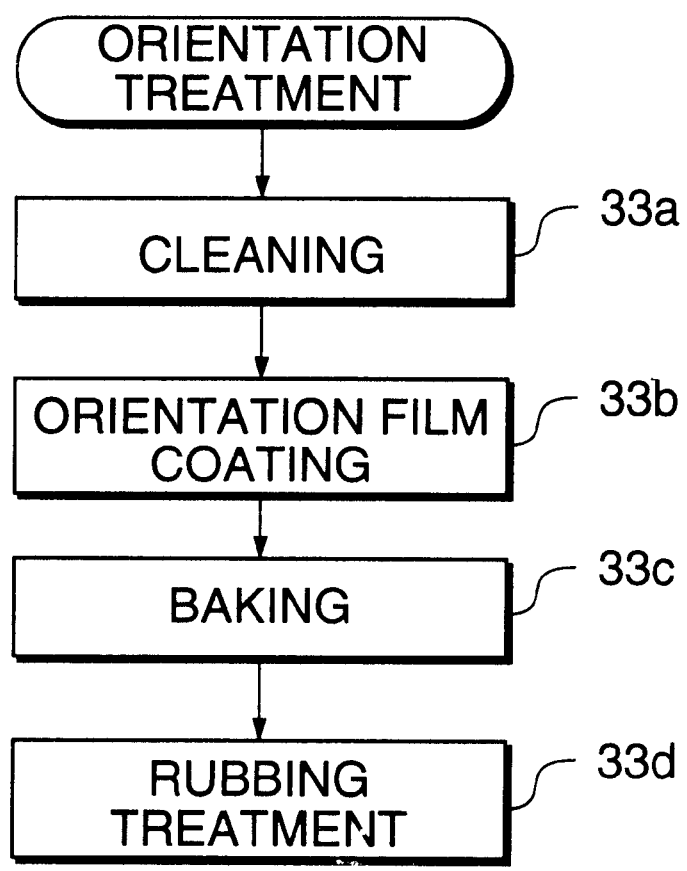
FIG. 12 is a flowchart showing an orientation process.

More specifically, as shown in FIG. 12, in cleaning step 33a, cleaning treatment is performed under predetermined conditions on the first and second glass substrates 1, 8 with the metal thin films 5 deposited on the first and the second ITO films 2, 9, respectively. Then, in orientation film coating step, a polyimide material is applied by flexographic printing to the first and second glass substrates 1, 8 to form the first and second orientation films 4, 11. In the following baking step 33c, baking treatment is performed under predetermined conditions. Then, in rubbing treatment step 33d, in order to orient liquid crystal molecules in a predetermined direction, rubbing treatment is performed by rubbing the surfaces of the orientation films 4, 11 in the predetermined direction with buff cloth wound around a rotating metal roller.

Next, in a seal forming process 34 in FIG. 8, using screen printing, the main seal portion 19 having a liquid crystal injection port is formed on the first glass substrate 1, and the conducting seal portion 18 is formed on the second glass substrate 8. The seal 12 is formed by combining the two portions.

Figure 13:
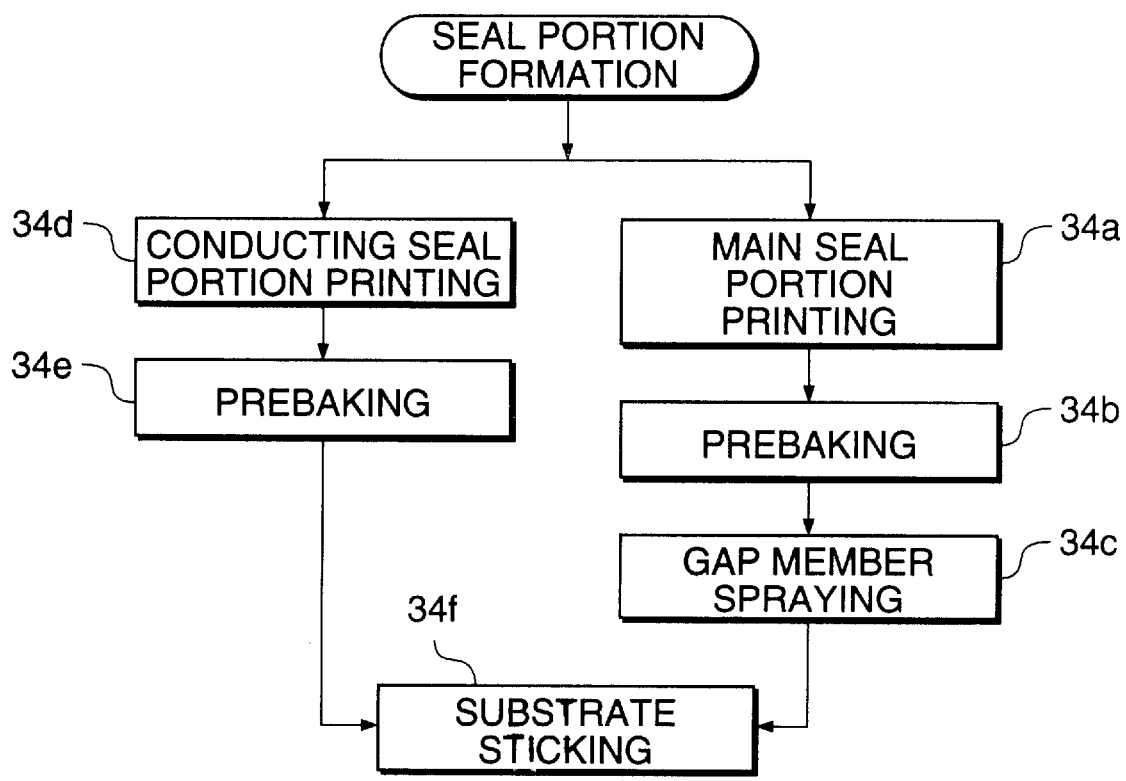
FIG. 13 is a flowchart showing a seal forming process.

More specifically, as shown in FIG. 13, in main seal portion printing step 34a, a screen form for main seal, generally shaped in the form of a frame, is prepared, and an epoxy resin containing the second spacers 22 of a glass fiber material dispersed generally evenly therein is screen-printed on the first glass substrate 1, followed by prebaking treatment in prebaking step 34b, to form the main seal portion 19. Subsequently, in gap member spraying step 34c, gap members of a plastic material for controlling the thickness of the liquid crystal layer are sprayed into the interior of the main seal portion 19.

On the other hand, in conducting seal portion printing step 34d, a linear screen form for conducting seal is prepared, and an epoxy resin containing the first spacers 21 having the first spacer diameter D1 which is smaller than the second spacer diameter D2 by the predetermined value X and the conductive particles 20 of Au is screen-printed on the second glass substrate 8, followed by prebaking treatment in prebaking step 34e, to form the conducting seal portion 18. Subsequently, in substrate sticking step 34f, the first glass substrate 1 and the second glass substrate 8 are stuck together such that the main seal portion 19 is flush with the conducting seal portion 18.

Next, in a liquid crystal injection and breaking process 35 in FIG. 8, liquid crystal is injected into the interior of the seal 12, and then the glass substrates 1, 8 with liquid crystal cells formed thereon by the multi-cell bonding are broken into individual liquid crystal cells.

Figure 14:
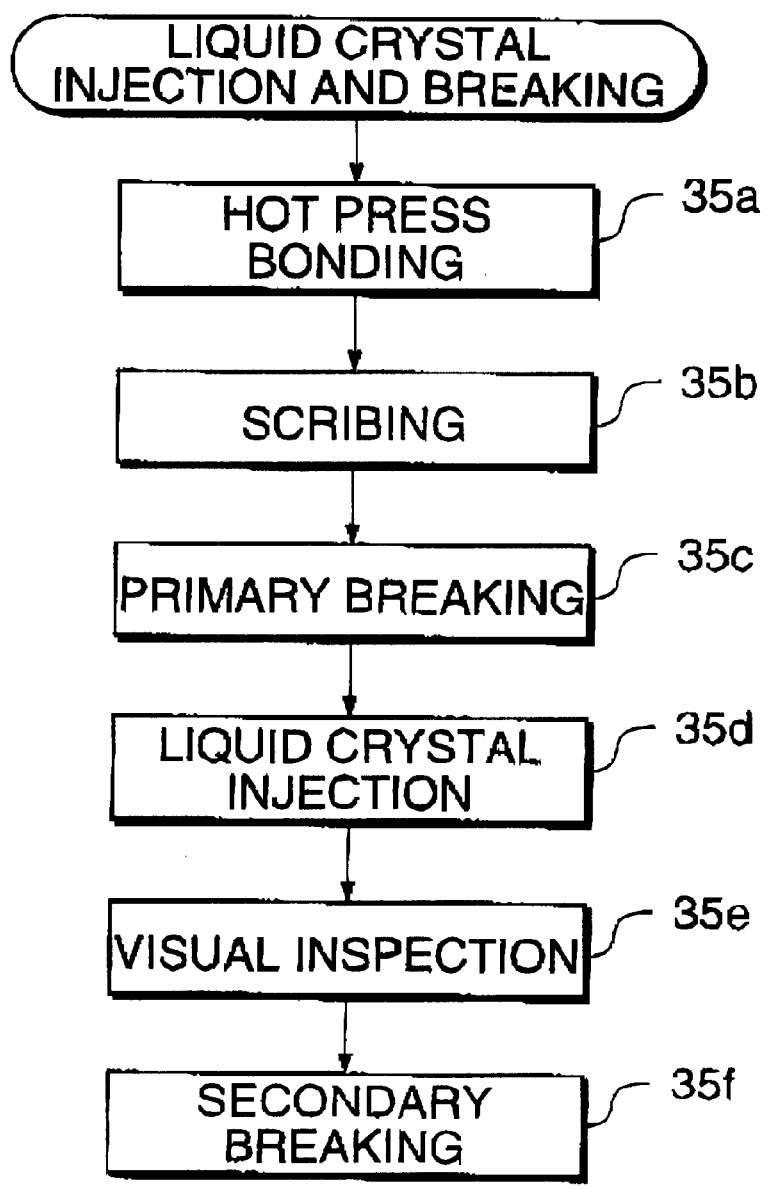
FIG. 14 is a flowchart showing a liquid crystal injection and breaking process.

More specifically, as shown in FIG. 14, in hot press bonding step 35a, the first and second glass substrates 1, 8 that are stuck together as described above are press bonded together under heat (baked) with a hot press heated to a predetermined temperature, followed by a scribing step 35b, in which crack lines are scribed in a strip pattern with a glass scriber to facilitate the injection of liquid crystal through the liquid crystal injection port. Then, in primary breaking step 35c, breaking is performed along the crack lines to obtain strips. In liquid crystal injection step 35d, a liquid crystal material is injected through the liquid crystal injection port by means of a vacuum injection method, and the liquid crystal injection port is subsequently sealed with a sealant such as an UV-setting resin or the like. Then, in visual inspection step 35e, visual inspection is performed under predetermined conditions to check the presence of foreign matters, breaking failure, and the like. In the following secondary breaking step 35f, the glass substrates 1, 8 are broken in a direction perpendicular to the crack lines along which the breaking was performed in the primary breaking step 35c, to obtain a multiplicity of liquid crystal cells.

Next, in a polarizer-applying and driving IC-mounting process 36 in FIG. 8, polarizing plates 14, 15 are applied to the back surfaces of the glass substrates 1, 8, and the driving IC 6 is mounted by COG mounting onto the first glass substrate 1.

Figure 15:
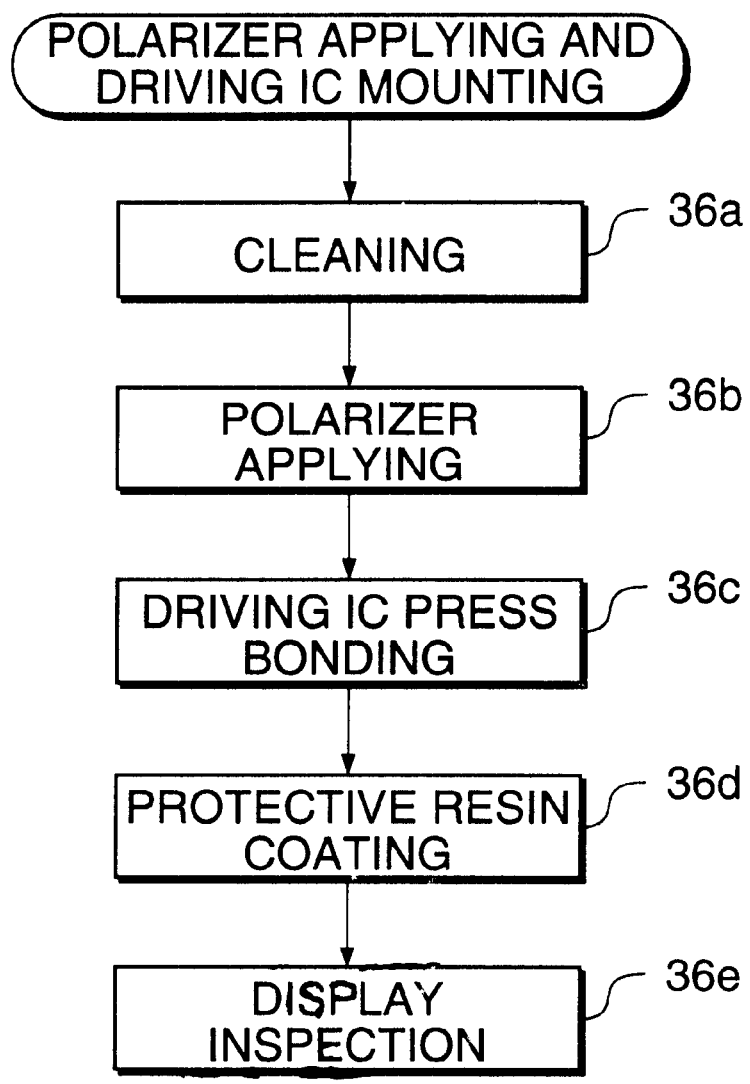
FIG. 15 is a flowchart showing a polarizer applying and driving IC mounting process.
Figure 16:
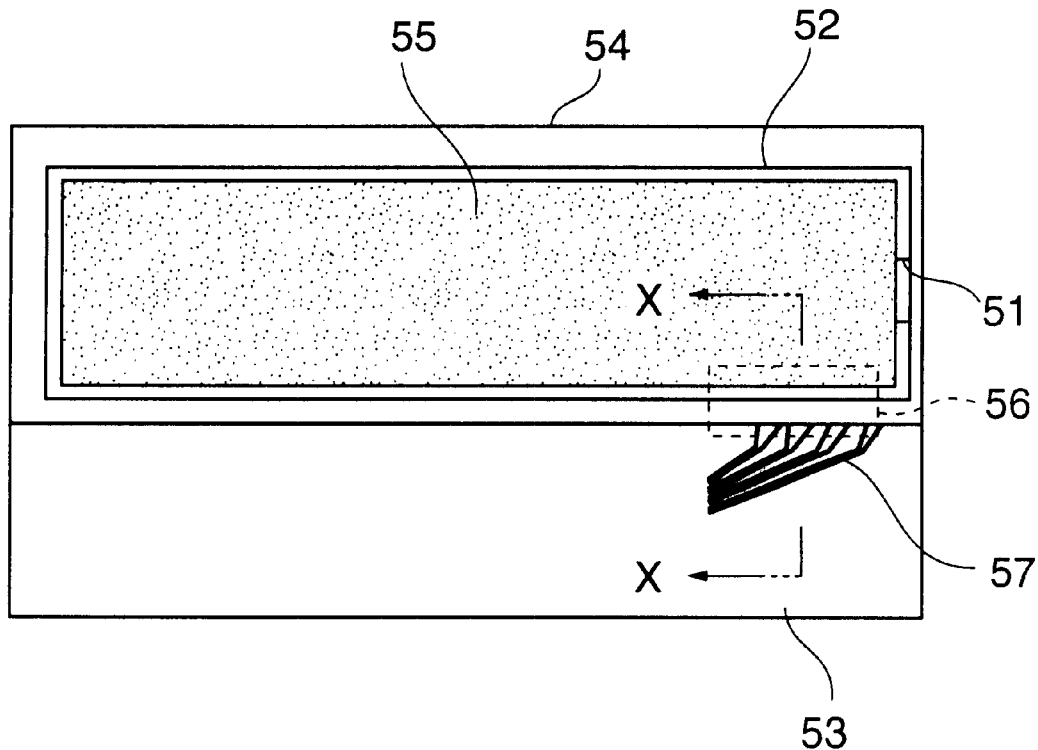
FIG. 16 is a top plan view schematically showing a liquid crystal display device according to the prior art.
Figure 17:
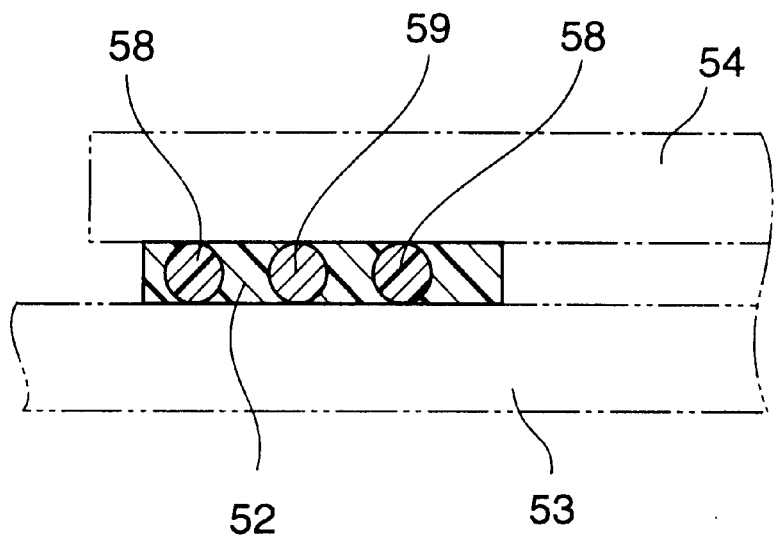
FIG. 17 is a sectional view of an essential part of a conventional seal.
Figure 18:
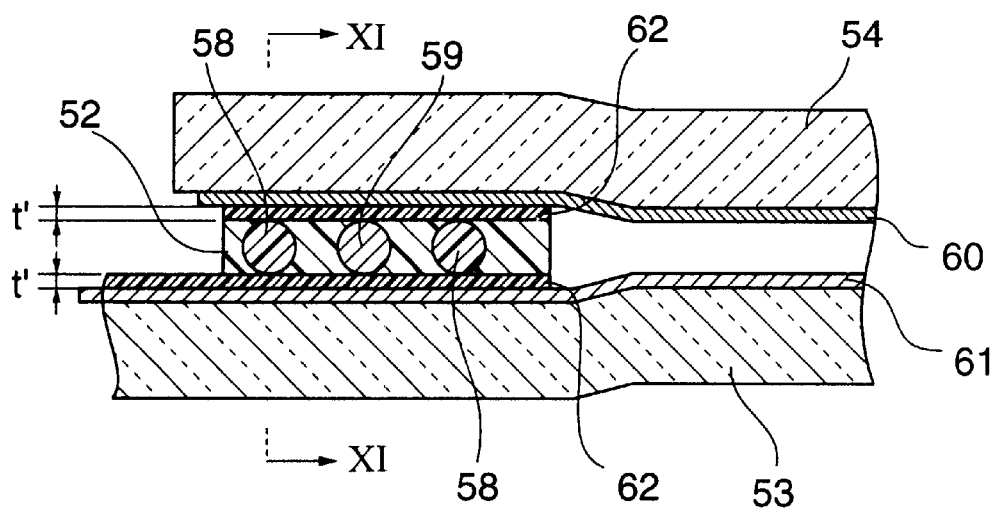
FIG. 18 is a sectional view taken along line X—X in FIG. 16.
Figure 19:
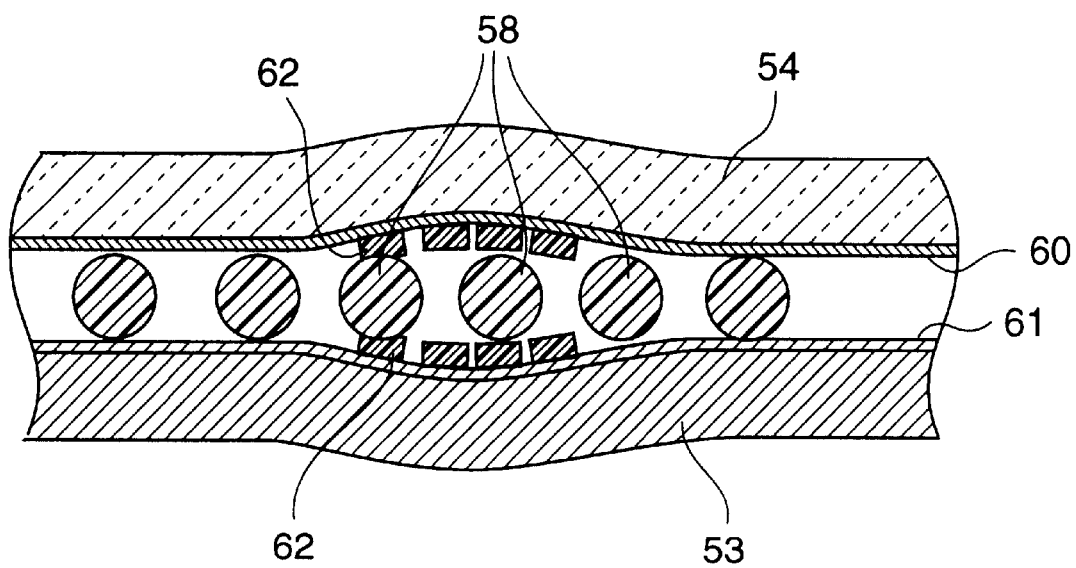
FIG. 19 is a sectional view taken along line XI—XI in FIG. 18.
Figure 20:
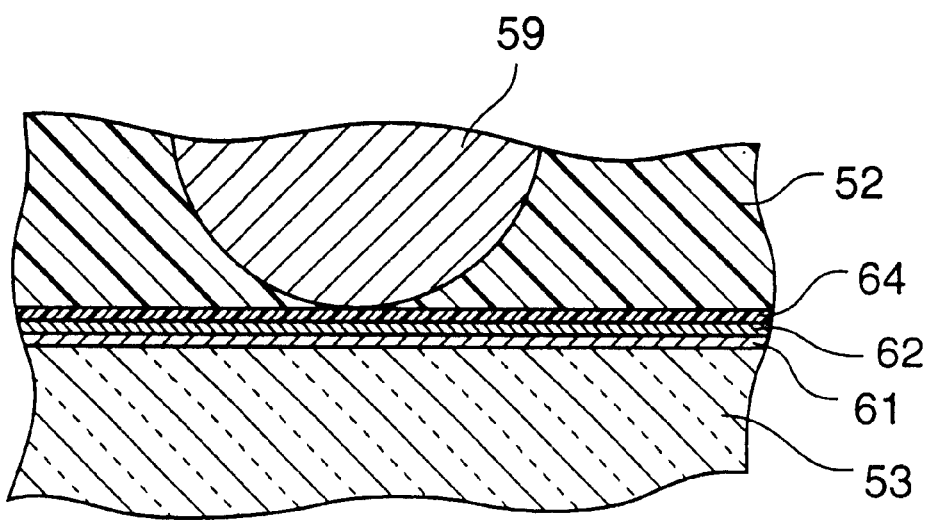
FIG. 20 is an enlarged sectional view of an essential part of a conventional vertical conducting portion.

More specifically, as shown in FIG. 15, in cleaning step 36a, dust, contamination and the like are cleaned off from the surfaces of the substrates, electrode terminals, etc. using a predetermined cleaning solution. Then, in polarizer applying step 36b, polarizing plates containing PVA and iodine are applied to the back surfaces of the glass substrates 1, 8 by means of a press roller applicator. In driving IC press bonding step 36c, the driving IC 6 is press bonded to the first glass substrate 1 at a predetermined portion thereof to be electrically connected to the metal thin film 5, and then in protective resin coating step 36*d*, a protective resin such as silicone resin is applied to the periphery of the driving IC 6 for protection thereof. Finally, in display inspection step 36*e*, voltage is applied to inspect the display of the liquid crystal to complete the manufacture of a liquid crystal display device.

Thus, in the present embodiment, the seal 12 is divided into the main seal portion 19 and the conducting seal portion 18, and fabricated separately. The spacer diameter of the first spacers 21 mixed in the conducting seal portion 18 (first spacer diameter D1) is made smaller than the spacer diameter of the second spacers 22 mixed in the main seal portion 19 (second spacer diameter D2) by the predetermined value X. As a result, it is possible for the entire seal 12 to have a uniform thickness, thus ensuring a uniform thickness distribution of the liquid crystal layer and thereby eliminating the color unevenness in the background color during liquid crystal display. Besides, a multiplicity of protrusions having a predetermined peak height H and predetermined number density ρ are formed on the surfaces of the metal thin films 5 so that conductive connection between the first and the second transparent conductive films 2, 9 is reliably ensured. It is thus possible to eliminate conduction failure, and thereby to provide a liquid crystal display device with improved reliability.

The present invention is not limited to the above described embodiment. For example, while in the above described embodiment the main seal portion 19 and the conducting seal portion 18 are formed on the first glass substrate 1 and the second glass substrate 8, respectively, it goes without saying that the main seal portion 19 and the conducting seal portion 18 may be formed on the second glass substrate 8 and the first glass substrate 1, respectively.

Now, examples of the present invention will be described in detail.

EXAMPLE 1

Ten kinds of liquid crystal cells with the second spacer diameter D2 being identical and with only the first spacer diameter D1 being varied, were prepared, 500 specimens each. A display test was carried out on these specimens to determine the effect of the difference between the first spacer diameter D1 and the second spacer diameter D2 on the liquid crystal display.

First, a sufficient number of sets, each set consisting of two glass plates (the first and second glass substrates 1, 8) having a size of 300 mm long, 315 mm wide and 1.1 mm thick, were prepared to obtain in total 5000 liquid crystal cells.

After ITO films were coated by the sputtering method on the surfaces of the first and second glass substrates 1, 8, the ITO films 2, 9 of predetermined patterns having a film thickness of 0.03 $\mu$m were formed on the first and second glass substrates 1, 8 using the well known photolithographic technique as described hereinbefore.

Then, a flexographic form having such a shape as to prevent the plated metal from adhering to the display portion of the liquid crystal display device was prepared, and a Si—Ti alkoxide solution was applied by flexographic printing to the surfaces of the first and second ITO films 2, 9. The composition of the Si—Ti alkoxide solution was adjusted so as to obtain a ratio of SiO2:TiO2=TiO2=1:1 in terms of SiO2 and TiO2. The printing conditions of the flexographic printing and the viscosity of the Si—Ti alkoxide solution were adjusted so as to obtain the transparent insulating films 3, 10 with a film thickness of 0.06 $\mu$m.

Then, the first and second glass substrates 1, 8 were dried on a hot plate heated to 80° C. for 3 to 5 minutes, and subsequently irradiated with an ultraviolet ray of wavelength 250 nm using a high pressure mercury lamp, followed by baking treatment at 300° C. for 30 minutes, to form the transparent insulating films 3, 10 of SiO2—TiO2 having a film thickness of 0.06 $\mu$m on the surfaces of the first and second ITO films 2, 9 used for liquid crystal display.

The first and second glass substrates 1, 8 with the transparent insulating films 3, 10 thus laminated on the surfaces thereof were cleaned with a cleaning solution for degreasing treatment and the like. An alkaline aqueous solution containing 50 g/l of an alkaline cleaner (C-4000 manufactured by C. Uyemura & Co., Ltd.) was used as the cleaning solution. After neutralizing treatment was performed using an aqueous hydrochloric solution containing 100 ml/l of hydrochloric acid, the first and second glass substrates 1, 8 were dipped in a Sn—Pd mixture solution (catalyst solution) for 1 to 3 minutes. An aqueous solution containing 100 ml/l of SKN-200 (manufactured by C. Uyemura & Co., Ltd.) was used as the catalyst solution. After completion of the catalyst treatment, the first and second glass substrates 1, 8 were rinsed with water, and then dipped in an accelerator solution to seed catalytic metal nuclei (Pd) on the surfaces to facilitate precipitation of the plated metal. An aqueous solution containing 100 ml/l of AL-106 (manufactured by C. Uyemura & Co., Ltd.) was used as the accelerator solution. Then, electroless Ni—P plating was performed using the transparent insulating films 3, 10 as a mask and phosphinate as a reducing agent to selectively precipitate a Ni—P alloy on the portions of the ITO films 2, 9 where the transparent insulating films 3, 10 were not formed. NPR4 (manufactured by C. Uyemura & Co., Ltd.) was used as the electroless Ni—P plating bath. Then, electroless gold plating was performed using Muden Gold (manufactured by Okuno Chemical Industries Co., Ltd.) as an electroless gold plating bath to cause precipitation of Au on the Ni film by substitution reaction with P, thereby depositing the metal thin film 5 having a multiplicity of protrusions 24 on the ITO films 2, 9. Then, heat treatment was performed at 250° C. for 30 minutes to increase the adhesion strength of Ni. The peak height H and number density ρ of the protrusions were measured with an electron microscope. The peak height H was found to be 0.17 $\mu$m, and the number density ρ was found to be 0.18 pc./$\mu$m$^2$.

Then, ultrasonic cleaning was performed on the first and second glass substrates 1, 8 with the metal thin films 5 formed on the surfaces thereof, and a polyimide material was applied to the first and second glass substrates 1, 8 by flexographic printing. After baking treatment at 300° C. for 30 minutes, rubbing treatment was performed by rubbing the polyimide material-applied surfaces in a predetermined direction with buff cloth wound around a rotating metal roller to orient the liquid crystal molecules in the predetermined direction to form the first and the second orientation films 4, 11 with a film thickness of 0.07 $\mu$m.

An epoxy resin containing second spacers 22 generally evenly dispersed therein was then screen-printed on the first glass substrate 1 and prebaked at 80° C. for 30 minutes to form the main seal portion 19 generally in the form of a frame. Then, gap members were sprayed into the interior of the main seal portion 19 to control the thickness of the liquid crystal layer. Spacers made of glass fiber having the second spacer diameter D2 of 6.3 $\mu$m were used as the second spacers 22, and plastic gap members having a particle diameter of 6 $\mu$m were used as the gap members to make the thickness of the liquid crystal layer equal to 6 $\mu$m.

On the other hand, an epoxy resin containing the first spacers 21 with a spacer diameter smaller than the second spacer diameter D2 by the predetermined value X and conductive particles 20 of Au was screen-printed on the second glass substrate 8, and then prebaked at 80° C. for 30 minutes in the prebaking step 34e to form the linear conducting seal portion 18. Spacer diameters in a range of 4.8 to 6.3 μm were used as the first spacer diameter D1. Particles having a diameter larger than the first spacer diameter D1 by 0.7 μm were used as the conductive particles 20, and added to the conducting seal portion 18 in an amount of 1 weight %.

Thereafter, the first glass substrate 1 and the second glass substrate 8 were stuck together such that the main seal portion 19 was flush with the conducting seal portion 18.

Then, the first and second glass substrates 1, 8 stuck together were press bonded under heat with a hot press heated to a temperature of 180° C. Crack lines were then scribed in a strip pattern on the first and second glass substrates 1, 8 with a glass scriber to facilitate the injection of liquid crystal. Then, the primary breaking was performed to break the integral first and second glass substrates along the crack lines into strips. An esther-based STN liquid crystal material was injected into the interior of the seal 12 through the liquid crystal injection port by means of the vacuum injection method. The liquid crystal injection port was thereafter sealed with a sealant such as a UV-setting resin or the like using a dispenser.

Then, visual inspection was performed to check the presence of foreign matters, the presence of breaking failure, and the like. Thereafter, secondary breaking was performed to break the glass substrates 1, 8 in a direction perpendicular to the crack lines along which the primary breaking was performed to form a multiplicity of liquid crystal cells from the large-sized glass substrates (300 mm long, 315 mm wide, and 1.1 mm thick).

In this way, in Example 1, ten kinds of liquid crystal cells differing only in the first spacer diameter D1 were prepared, 500 specimens each.

A display test was carried out by applying a square wave voltage of 1.5 V, at a frequency of 1024 Hz, to each liquid crystal cell, and visually inspecting for color unevenness in the background color during liquid crystal display, and the reliability of the liquid crystal cells was evaluated.

Table 1 shows the experimental results.

TABLE 1

| | FIRST SPACER THICKNESS D1 (μm) | SECOND SPACER THICKNESS D2 (μm) | FILM THICKNESS OF METAL THIN FILM (μm) | D2-D1 (μm) | TEST RESULTS DEFECT RATIO η (%) | EVALUATION |
|---|---|---|---|---|---|---|
| EXAMPLES ACCORDING TO PRESENT INVENTION | | | | | | |
| 1 | 5.3 | 6.3 | 0.44 × 2 | 1.0 | 0.0 | ○ |
| 2 | 5.5 | 6.3 | 0.44 × 2 | 0.8 | 0.0 | ○ |
| 3 | 5.7 | 6.3 | 0.44 × 2 | 0.6 | 0.2 | ○ |
| 4 | 5.9 | 6.3 | 0.44 × 2 | 0.4 | 0.6 | ○ |
| 5 | 5.1 | 6.3 | 0.64 × 2 | 1.2 | 0.2 | ○ |
| 6 | 5.5 | 6.3 | 0.64 × 2 | 0.8 | 0.0 | ○ |
| 7 | 5.1 | 6.3 | 0.44 × 2 | 1.2 | 0.4 | ○ |
| COMPARATIVE EXAMPLES | | | | | | |
| 51 | 4.8 | 6.3 | 0.44 × 2 | 1.5 | 1.8 | × |
| 52 | 6.1 | 6.3 | 0.44 × 2 | 0.2 | 2.4 | × |
| 53 | 6.3 | 6.3 | 0.44 × 2 | 0 | 5.6 | × |
| 54 | 5.9 | 6.3 | 0.64 × 2 | 0.4 | 2.6 | × |

Two kinds of metal thin films, with a film thickness t of 0.44 μm and 0.64 μm, were prepared under respective different plating conditions. In the case of metal thin films 5 with the film thickness t of 0.44 μm, a Ni layer and a Au layer were formed with film thicknesses of 0.4 μm and 0.04 μm, respectively, and in the case of metal thin films 5 with the film thickness of 0.64 μm, a Ni layer and a Au layer were formed with film thicknesses of 0.6 μm and 0.04 μm, respectively.

In a comparative example 51, a defect ratio η of color unevenness in the background color was as high as 1.8%. This is considered to be because the first spacer diameter D1 of the comparative example 51 was too small, so that the thickness of the main seal portion 19 became larger than that of the conducting seal portion 18, leading to the high probability of color unevenness in the background color.

In the case of comparative examples 52 to 54, the difference between the second spacer diameter D2 and the first spacer diameter D1 was too small, so that due to the film thickness t of the metal thin film 5, the thickness of the conducting seal portion 18 became larger than that of the main seal portion 19, again leading to color unevenness in the background color, and to reduction of the yield with a defect ratio not less than 2%.

In contrast, in examples 1 to 4 according to the present invention, the predetermined value X (=D2−D1) was in a range 1.0 to 0.4 μm, and in examples 5, 6, and 7 according to the present invention, the predetermined value X (D2−D1) was 1.2 μm, 0.8 μm, and 1.2 μm, respectively. It can be seen that in all the examples the defect ratio η was not greater than 1%, and reduction of the yield could be avoided to the maximum possible extent.

As discussed earlier, in order to provide uniform thickness of the liquid crystal layer, it is necessary to set the predetermined value X in the range of (2t+0.5) to (2t−0.6). Thus, when the film thickness t of the metal thin film 5 is 0.44 μm, the predetermined value X (=D2−D1) should be in a range of 1.38 to 0.28, and when the film thickness t of the metal in film 5 is 0.64 μm, the predetermined value X (=D2−D1) should be in. a range of 1.78 to 0.68. In all the examples 1 to 6 according to the present invention, the predetermined value X falls in this specified range, and this is considered to be the reason why the defect ratio was restrained to values of not greater than 1%. In particular, in the examples 1, 2 and 6 according to the present invention, where the predetermined value X was in a range of 0.8 to 1.2, no defect was observed, and thus it was ascertained that excellent results can be obtained with the value X in this range.

EXAMPLE 2

Next, under respective different plating conditions, 12 kinds of liquid crystal cells, 500 specimens each, having metal thin films 5 of different values of peak height H and number density ρ, were prepared, and a display test was carried out to determine the effect of peak height H and number density ρ on the quality of liquid crystal display.

Under the same manufacturing conditions as in Example 1, a multiplicity of liquid crystal cells were prepared as specimens from large-size glass substrates.

Spacers to be mixed into the seal 12 were used, which had the first spacer diameter D1 of 5.5 μm and the second spacer diameter D2 of 6.3 μm.

Under the same conditions as in Example 1, a display test was carried out by applying a square wave voltage of 1.5 V, at a frequency of 1024 Hz, to each liquid crystal cell, visually inspecting for color unevenness in the background color in the liquid crystal display, and the reliability of the liquid crystal cell was evaluated. Table 2 shows results of the display test.

A comparative example 61 is the case where protrusions 24 were not formed, and the defect ratio η was high as 2.4%. This is considered to be due to the fact that as discussed earlier, in the conventional liquid crystal display device, the resin thin film 23 tends to act as an insulating film with high probability.

A comparative example 62 is the case where protrusions 24 were formed, but the peak height H and the number density ρ were both so small that conduction failure can occur between the metal thin film 5 and the conductive particles 20, leading to a high defect ratio η.

A comparative example 63 and a comparative example 64 are the cases where the number density ρ of protrusions 24 were 0.16 to 0.24 pc./μm$^2$ and hence in the range of the present invention, but the peak height H was so small that the resin thin film 23 can act as an insulating film. Thus, the desired conductive connection may sometimes fail, and the defect ratio exceeds 1% in both cases.

In comparative examples 65 to 67, although the peak height H was 0.08 to 0.17 μm and hence in the range of the present invention, the number density ρ was not greater than 0.1 pc./μm$^2$ and so small that the conductive particles 20 came into contact only with the resin thin film 23 and not with the protrusions 24. This is considered to have led to the high defect ratio η.

In contrast, in examples 11 to 15 according to the present invention, the peak height H of the protrusions was in a range of 0.05 to 0.50 μm, and the number density ρ of the protrusions was in a range of 0.1 to 0.5 pc./μm$^2$, leading to good results with the defect ratio not exceeding 0.5% in any case.

As described above in detail, a liquid crystal display device according to the present invention includes a plurality of spacer members mixed and generally evenly dispersed in the seal to control the thickness of the seal, comprising first spacer members mixed in the conducting seal portion, and second spacer members mixed in portions of the seal other than the conducting seal portion, the first spacer members being smaller in diameter than the second spacer members by the predetermined value X so that even where metal thin

TABLE 2

| | PEAK HEIGHT H (μm) | NUMBER DENSITY ρ (Pc./μm$^2$) | TEST RESULTS | |
|---|---|---|---|---|
| | | | DEFECT RATIO η (%) | EVALUTION |
| EXAMPLES ACCORDING TO PRESENT INVENTION | | | | |
| 11 | 0.11 | 0.11 | 0.4 | ○ |
| 12 | 0.12 | 0.13 | 0.2 | ○ |
| 13 | 0.17 | 0.18 | 0 | ○ |
| 14 | 0.26 | 0.30 | 0.2 | ○ |
| 15 | 0.42 | 0.44 | 0.4 | ○ |
| COMPARATIVE EXAMPLES | | | | |
| 61 | 0 | 0 | 2.4 | × |
| 62 | 0.03 | 0.04 | 3.2 | × |
| 63 | 0.04 | 0.16 | 1.8 | × |
| 64 | 0.04 | 0.24 | 2.8 | × |
| 65 | 0.08 | 0.07 | 1.6 | × |
| 66 | 0.12 | 0.06 | 1.8 | × |
| 67 | 0.17 | 0.04 | 1.2 | × | films are deposited on the transparent conductive films, the thickness of the seal in the conducting seal portion can 5 be reduced to provide a generally uniform thickness distribution of the liquid crystal layer, thereby avoiding color unevenness in the background color during liquid crystal display.

By setting the predetermined value X in the range of (2t+0.5) to (2t−0.6) (t represents the film thickness of the metal thin films), color unevenness in the background color can be reliably avoided, leading to improved reliability of the liquid crystal display device.

Further, according to the present invention, conductive members are mixed in the conducting seal portion, and a multiplicity of protrusions are formed on the metal thin film. As a result, the first and second transparent conductive films are electrically interconnected via the conducting members and the metal thin film, and even if resin thin films are formed on the upper and lower surfaces of the seal, conducting connection can be ensured between the conductive members and the protrusions, thereby eliminating the occurrence of conduction failure.

By setting the peak height of the protrusions in the range of 0.05 to 0.50 $\mu$m, and the number density of the protrusions in the range of 0.1 to 0.5 pc./$\mu$m2, conduction failure between the conductive particles and the metal thin film can be reliably avoided, leading to improved reliability of the liquid crystal display device.

What is claimed is:

1. In a liquid crystal display device including a first transparent substrate having a first transparent conductive film formed on a surface thereof, a second transparent substrate having a second transparent conductive film formed on a surface thereof opposed to said first transparent conductive film, liquid crystal sandwiched between said first transparent substrate and said second transparent substrate, a seal encapsulating said liquid crystal in an airtight manner, and a driving circuit, said seal including a conducting portion disposed so as to electrically interconnect said first transparent conductive film and said second transparent conductive film, said first and second transparent conductive films having metal thin films deposited on respective predetermined surface portions thereof including said conducting portion, said driving circuit being connected to said metal in films for carrying out liquid crystal display control, the improvement comprising:
    a plurality of spacer members mixed and generally evenly dispersed in said seal, for controlling thickness of said seal, said plurality of spacer members comprising first spacer members mixed in said conducting portion, and second spacer members mixed in portions of said seal other than said conducting portion, said first spacer members having a particle diameter smaller than that of said second spacer members by a predetermined value X; and
    a multiplicity of conductive members mixed in said conducting portion;
    wherein said metal thin films have a multiplicity of protrusions formed thereon; and
    wherein said first and second transparent conductive films are electrically interconnected via said conductive members and said protrusions.

2. A liquid crystal display device as claimed in claim 1, wherein said protrusions have a peak height thereof set in a range of 0.05 to 0.50 $\mu$m, and a number density thereof set in a range of 0.1 to 0.5 pc./$\mu$m$^2$.

3. In a liquid crystal display device including a first transparent substrate having a first transparent conductive film formed on a surface thereof, a second transparent substrate having a second transparent conductive film formed on a surface thereof opposed to said first transparent conductive film, liquid crystal sandwiched between said first transparent substrate and said second transparent substrate, a seal encapsulating said liquid crystal in an airtight manner, and a driving circuit, said seal including a conducting portion disposed so as to electrically interconnect said first transparent conductive film and said second transparent conductive film, said first and second transparent conductive films having metal thin films deposited on respective predetermined surface portions thereof including said conducting portion, said driving circuit being connected to said metal thin films, for carrying out liquid crystal display control, the improvement comprising:
    a plurality of spacer members mixed and generally evenly dispersed in said seal, for controlling thickness of said seal, said plurality of spacer members comprising first spacer members mixed in said conducting portion, and second spacer members mixed in portions of said seal other than said conducting portion, said first spacer members having a particle diameter smaller than that of said second spacer members by a predetermined value X; and
    a multiplicity of conductive members mixed in said conducting portion;
    wherein said metal thin films have a multiplicity of protrusions formed thereon;
    wherein said first and second transparent conductive films are electrically interconnected via said conductive members and said protrusions; and
    wherein said predetermined value X is set in a range of (2t+0.5) to (2t−0.6) $\mu$m (t represents thickness of said metal thin films).

4. A liquid crystal display device as claimed in claim 3, wherein said protrusions have a peak height thereof set in a range of 0.05 to 0.50 $\mu$m, and a number density thereof set in a range of 0.1 to 0.5 pc./$\mu$m$^2$.

5. In a liquid crystal display device including a first transparent substrate having a first transparent conductive film formed on a surface thereof, a second transparent substrate having a second transparent conductive film formed on a surface thereof opposed to said first transparent conductive film, liquid crystal sandwiched between said first transparent substrate and said second transparent substrate, a seal encapsulating said liquid crystal in an airtight manner, and a driving circuit, said seal including a conducting portion disposed so as to electrically interconnect said first transparent conductive film and said second transparent conductive film, said first and second transparent conductive films having metal thin films deposited on respective predetermined surface portions thereof including said conducting portion, said driving circuit being connected to said metal thin films, for carrying out liquid crystal display control, the improvement comprising:
    a plurality of spacer members mixed and generally evenly dispersed in said seal, for controlling thickness of said seal, said plurality of spacer members comprising first spacer members mixed in said conducting portion, and second spacer members mixed in portions of said seal other than said conducting portion, said first spacer members having a particle diameter smaller than that of said second spacer members by a predetermined value X; and
    a multiplicity of conductive members mixed in said conducting portion;
    wherein said metal thin films have a multiplicity of protrusions formed thereon;

wherein said first and second transparent conductive films are electrically interconnected via said conductive members and said protrusions; and wherein said predetermined value X is set in a range of (2t+0.4) to (2t−0.1) µm.

6. A liquid crystal display device as claimed in claim 5, wherein said protrusions have a peak height thereof set in a range of 0.05 to 0.50 µm, and a number density thereof set in a range of 0.1 to 0.5 pc./µm².

7. A method of manufacturing a liquid crystal display device, which comprises the steps of:

1) forming first and second transparent conductive films of predetermined pattern on opposed surfaces of first and second transparent substrates, respectively;

2) forming first and second transparent insulating films on portions of said first transparent conductive film and said second transparent conductive film corresponding to a liquid crystal display portion, respectively;

3) performing electroless Ni—P alloy plating using said first and second transparent insulating films as a mask to cause a NI—P alloy to selectively precipitate on portions of said first and second transparent conductive films where said first and second transparent insulating films are not formed, followed by electroless gold plating using a predetermined electroless gold plating bath to cause Au to precipitate on a Ni film by substitution reaction with P, thereby forming metal thin films with a multiplicity of protrusions having a predetermined peak height H and a number density ρ formed on surfaces thereof on the portions of said first and second transparent conductive films;

4) printing a resin which contains second spacer members generally evenly dispersed therein, on one of said first and second transparent substrates, thereby forming a main seal portion;

5) printing a resin which contains first spacer members generally evenly dispersed therein, said first spacer members having a particle diameter smaller than that of said second spacer members by a predetermined value, on the other of said first and second transparent substrates, thereby forming a conducting seal portion;

6) laminating said first and second transparent substrates such that said main seal portion and said conducting seal portion are aligned with each other, to form a seal by said main seal portion and said conducting seal portion; and 7) injecting liquid crystal into said seal, and breaking the laminated first and second transparent substrates into a plurality of liquid crystal cells.

* * * * *